(12) United States Patent
Podporkin

(10) Patent No.: US 11,469,594 B2
(45) Date of Patent: Oct. 11, 2022

(54) ARRESTER WITH PRESSURIZING CHAMBERS

(71) Applicant: STREAMER, ELECTRIC COMPANY INC., Sankt-Petersburg (RU)

(72) Inventor: Georgy Viktorovich Podporkin, St. Petersburg (RU)

(73) Assignee: STREAMER, ELECTRIC COMPANY INC., Sankt-Petersburg (RU)

( * ) Notice: Subject to any disclaimer, the term of this patent is extended or adjusted under 35 U.S.C. 154(b) by 114 days.

(21) Appl. No.: 16/610,842

(22) PCT Filed: May 5, 2017

(86) PCT No.: PCT/RU2017/000294
§ 371 (c)(1),
(2) Date: Nov. 4, 2019

(87) PCT Pub. No.: WO2018/203771
PCT Pub. Date: Nov. 8, 2018

(65) Prior Publication Data
US 2020/0161855 A1    May 21, 2020

(51) Int. Cl.
*H01T 1/02*     (2006.01)
*H02H 9/06*     (2006.01)
(Continued)

(52) U.S. Cl.
CPC .............. *H02H 9/06* (2013.01); *H01T 1/02* (2013.01); *H01T 1/14* (2013.01); *H01T 2/02* (2013.01); *H01T 4/06* (2013.01)

(58) Field of Classification Search
CPC .... H01T 2/02; H01T 4/16; H01T 4/00; H01T 4/02; H01T 4/10; H01T 4/12; H01T 1/02;
(Continued)

(56) References Cited

U.S. PATENT DOCUMENTS

| | | | | |
|---|---|---|---|---|
| 6,108,187 A | * | 8/2000 | Podporkin | ........... H01B 17/005 |
| | | | | 174/144 |
| 2011/0304945 A1 | * | 12/2011 | Podporkin | ................ H01T 4/16 |
| | | | | 361/117 |

FOREIGN PATENT DOCUMENTS

| RU | 2 548 169 C2 | 4/2015 |
|---|---|---|
| RU | 151 863 U1 | 4/2015 |
| WO | WO 2010/082861 A1 | 7/2010 |

* cited by examiner

*Primary Examiner* — Bryan R Perez
(74) *Attorney, Agent, or Firm* — Birch, Stewart, Kolasch & Birch, LLP

(57) ABSTRACT

An arrester for lightning protection of electrical equipment or power transmission lines is disclosed. The arrester comprises an insulating body made of a dielectric and five or more electrodes mechanically connected to the insulating body and arranged to allow the formation of an electric discharge between adjacent electrodes under the influence of lightning overvoltage. The electrodes are located inside the insulating body and separated from its surface by a layer of insulation. Adjacent electrodes exit into discharge chambers having outlets to the surface of the insulating body. At least a part of the discharge chambers is provided with pressurizing chambers located near the electrodes and connected to the discharge chambers through the discharge gaps between adjacent electrodes. Thanks to the invention, the discharge arc is extinguished after the passage of the lightning overvoltage pulse before the follow current having the industrial frequency passes through zero, mainly immediately after the lightning overvoltage pulse.

20 Claims, 4 Drawing Sheets

(51) Int. Cl.
*H01T 1/14* (2006.01)
*H01T 2/02* (2006.01)
*H01T 4/06* (2006.01)

(58) Field of Classification Search
CPC .... H01T 1/20; H01T 1/10; H01T 1/08; H01T 1/14
See application file for complete search history.

ARRESTER WITH PRESSURIZING CHAMBERS

FIELD OF THE INVENTION

The invention relates to arresters for overvoltage protection, for example, lightning protection, of electrical equipment, high voltage power lines and electrical power networks. The invention also relates to elements of high voltage power lines equipped with such arresters.

PRIOR ART

Lightning discharges are one of the most dangerous phenomena for the operation of high-voltage power lines. During lightning overvoltage, the air gap between the current-carrying element of the power line and the grounded element overlaps. After the end of the lightning overvoltage pulse, this overlap becomes a power arc of an industrial frequency under the influence of an industrial frequency voltage applied to the current-carrying element.

To solve the problem of power arc appearance during lightning overvoltage, WO2010082861 teaches an arrester for lightning protection of electrical equipment or a power line, which contains an insulating body made of a solid dielectric, two main electrodes mechanically connected to the insulating body, and two or more intermediate electrodes configured to produce a discharge (for example, a streamer discharge) between each of the main electrodes and an intermediate electrode adjacent to it and between adjacent intermediate electrodes, wherein adjacent electrodes are disposed between the main electrodes with a mutual offset at least along the longitudinal axis of the insulating body. The arrester according to the said international application is characterized in that the intermediate electrodes are located inside the insulating body and separated from its surface by an insulation layer with thickness chosen to exceed the calculated diameter $D_k$ of the channel of the said discharge, wherein discharge chambers (cavities) are made between adjacent intermediate electrodes, wherein the cross-sectional area S of the discharge chambers in the zone of formation of the discharge channel is selected from the condition $S < D_K \cdot g$, where g is the minimum distance between the adjacent intermediate electrodes.

When such a multi-chamber arrester is exposed to a lightning overvoltage pulse, gaps between the electrodes are broken by electrical discharges. Due to the fact that the discharges between the intermediate electrodes occur inside chambers with very small volumes, when the channel expands, high gas pressure is created and the channels of spark discharges between the electrodes move to the surface of the insulating body and then are blown outward into the surrounding air under the influence of the high gas pressure.

Due to the arising blast and the elongation of the channels between the electrodes, the discharge arcs are cooled, the total resistance of all discharge arcs increases, i.e. the total resistance of the arrester increases, and the pulse current of the lightning overvoltage is limited. The lightning overvoltage current is diverted through the tower into the ground and a follow current of industrial frequency flows in continuation of it. When the current crosses zero, the arc is extinguished, and the power line continues uninterrupted operation.

This principle of operation of a multi-chamber arrester is quite effective, since the design of the arrester is simple, reliable and inexpensive. At the same time, the above-described arrester has such a disadvantage as a significant duration of the follow current. The reason for this is that the follow current has an industrial frequency and is required to cross zero to extinguish the arc. The frequency of transitions through zero is set by the industrial frequency and, therefore, cannot arbitrarily change. In this regard, additional measures are required aimed at extinguishing the arc immediately after the passage of a lightning discharge current.

DISCLOSURE OF THE INVENTION

The object of the present invention is to reduce the duration of the follow current in the multi-chamber arrester by ensuring the extinction of the arc after the passage of the lightning discharge pulse before the transition of the follow current having an industrial frequency through zero.

The object of the present invention is solved by an arrester for protection of elements of electrical equipment or power lines from overvoltage, the arrester contains an insulating body made with use of dielectric and two (preferably five) or more electrodes mechanically connected to the insulating body. The electrodes are located in such a way that allows the development of an electric discharge(s) between adjacent electrodes under the influence of an overvoltage (including an overvoltage pulse).

The arrester according to the present invention has the electrodes located inside the insulating body and separated from its surface by an insulation layer, wherein the adjacent electrodes exit into one or more discharge chambers having outlets to the surface of the insulating body. A characterizing feature of the present invention is that at least some discharge chambers (one or two or more discharge chambers) are provided with one or more pressurizing chambers connected to the outlets of the discharge chambers through the discharge gaps between the electrodes (preferably, adjacent ones). In this embodiment, the pressurizing chambers are also connected to the discharge chambers, since the discharge gaps between the electrodes are parts of the discharge chambers. In a particular embodiment, pressurizing chambers can be located near the electrodes.

In some embodiments, pressurizing chambers can be located along the electrodes. One or more pressurizing chambers can be confined by metal elements made with use of, for example, sheet metal at least partially enveloping the electrodes. The metal elements can at least partially envelop two electrodes exiting into adjacent discharge chambers. Pressurizing chambers can be combined for one or several discharge chambers or separate for discharge chambers. Separation of pressurizing chambers from each other can be accomplished by blocking metal elements (for example, made of sheet metal, in particular, such as tubes) in the parts confining pressurizing chambers.

In a particular embodiment, the metal elements can be tubes enclosing the electrodes and confining the pressurizing chambers, for example, they can be tubes adjacent to electrodes confining the pressurizing chambers in the transverse direction ("diametral plane"). The pressurizing chambers can be blocked in the part located between the electrodes, for example, by clamping the tubes in the transverse direction, thereby confining the pressurizing chambers in the longitudinal direction.

One or more pressurizing chambers can be connected to the outlets from the corresponding discharge chambers not by one channel but by two or more channels (for example, passing through the discharge gaps or going to them). In one embodiment, the dimensions of the pressurizing chambers in the directions along adjacent electrodes (for example, along the lines connecting the centers of adjacent electrodes), which are located near the pressurizing chambers, should be smaller than the dimensions of the pressurizing chambers in the directions perpendicular to the indicated directions along the adjacent electrodes.

In another embodiment, the dimensions of the pressurizing chambers (one or more chambers) in the directions along adjacent electrodes, which are located near the pressurizing chambers, should be less than the distances between adjacent electrodes in the discharge chambers. In addition, it can be provided that the dimensions of the pressurizing chambers (one or more chambers) in directions perpendicular to these directions along adjacent electrodes should be larger than the distances between adjacent electrodes in the discharge chambers.

In a preferred embodiment, volumes of the pressurizing chambers should be at least a half of the total volumes of the discharge chambers and the outlets connected to them. In addition, the volumes of the pressurizing chambers should preferably be no more than ten total volumes of the discharge chambers and the outlets connected to them. In cases where the discharge chamber is one, the volume of the pressurizing chamber should preferably be at least a half of the total volume of the discharge chamber and the outlet connected to it. For one discharge chamber, it can also be preferable that the volume of the pressurizing chamber is not more than ten total volumes of the discharge chamber and the outlet connected to it.

The object of the present invention is also solved by a method of manufacturing of the arrester according to any of the described above embodiments with use of a mold configured to shape the insulating body of the arrester and mandrels configured to shape pressurizing chambers, discharge chambers and discharge chamber outlets to the surface of the insulating body in the insulating body to be shaped. The method comprises the following steps: placing the electrodes and the mandrels in the mold, wherein the mandrels being placed between the electrodes; filling the mold with dielectric material and curing it, wherein the dielectric material is elastic when it has been cured; removing the insulating body from the mold; extraction the mandrels from the insulating body.

The object of the present invention is also solved by an insulator-arrester for mounting a high-voltage wire in electrical equipment or on an electrical power transmission line as a single insulator or as part of a column or string of insulators. The insulator-arrester has an insulating element and fixtures in the form of first and second fixture elements installed at its ends, the first fixture element being configured to be connected to a high-voltage wire directly or by means of a fastening device or to the second fixture element of a previous high-voltage insulator of the said column or string, and the second fixture element is configured to be connected to a tower or to the first fixture element of a subsequent high-voltage insulator of the said column or string.

Such an insulator-arrester contains the arrester according to any of the above embodiments and/or the arrester manufactured in accordance with the above-described method. The arrester is mounted in such a way that provide a possibility of development of an electric discharge between the first fixture element and at least one electrode adjacent to it, as well as the second fixture element and at least one electrode adjacent to it under the influence of lightning overvoltage.

The object of the present invention is also solved by corona ring-arrester containing an insulating and/or metal base configured to be mechanically fastened on an element of an electrical equipment or power line with at least partial enveloping of the said or adjacent element of the electric equipment or power line. The corona ring-arrester includes the arrester according to any of the above-described embodiments and/or the arrester manufactured in accordance with the above-described method, wherein the arrester is mounted at a distance from the enveloped element of the electrical equipment or power line.

The object of the present invention is also solved by an electrical power line containing towers, single insulators and/or insulators assembled in columns or strings, and at least one wire under high voltage connected directly or by means of fasteners with elements of fixture of single insulators and/or the first insulators of columns or strings of insulators, wherein each single insulator or each column or string of insulators is fastened to one of the towers by an element of its fixture adjacent to the said tower. In accordance with the invention, the power line includes at least one arrester according to any of the above-described embodiments and/or at least one arrester manufactured in accordance with the above-described method and/or at least one corona ring-arrester according to the above-described embodiment and/or at least one of the insulators is the insulator-arrester according to the above-described embodiment.

Thanks to the present invention, there is achieved such a technical result that the discharge arc is quenched after the passage of a lightning overvoltage pulse and before the follow current of the industrial frequency passes through zero. This is due to the fact that the high gas pressure generated during the expansion of the spark discharge channel allows compression of the air in the pressurizing chambers on the one hand and creation of a gas stream blowing the discharge arcs out from the chambers to the outside on the other hand.

After the gas flow, which is created due to the increased pressure generated as a result of an increase of the air (gas) temperature in the region of the spark discharge, moves the discharge arc out of the place of the spark discharge origin (i.e., from the discharge gap) to the outside of the chamber and makes it longer, the gas flow from the pressurizing chamber will ensure the removal of heated air (gas) from the discharge gap. Since the gas in the pressurizing chamber has a low temperature (corresponding to the temperature of the gas before the spark discharge has started), the gas temperature in the discharge gap decreases and, thereby, the resistance of the discharge gap increases.

Therefore, when the discharge arc has been moved out from the discharge chamber to the outside of the arrester, that is, it is extinguished (which is also facilitated by the additional gas flow coming out of the pressurizing chambers), the discharge cannot resume in the discharge gap of the discharge chamber since the overvoltage is already reduced due to the discharge to lower values at which the discharge arc cannot resume, while the discharge gap resistance is increased to normal due to the gas flow from the pressurizing chamber.

Thus, the duration of the follow current in the multi-electrode arrester is reduced up to zero depending on the parameters of the lightning overvoltage and the size of the discharge chambers. That is, only an overvoltage pulse current can flow through the arrester to the ground.

BEST MODE FOR CARRYING OUT THE INVENTION

Figure 1:
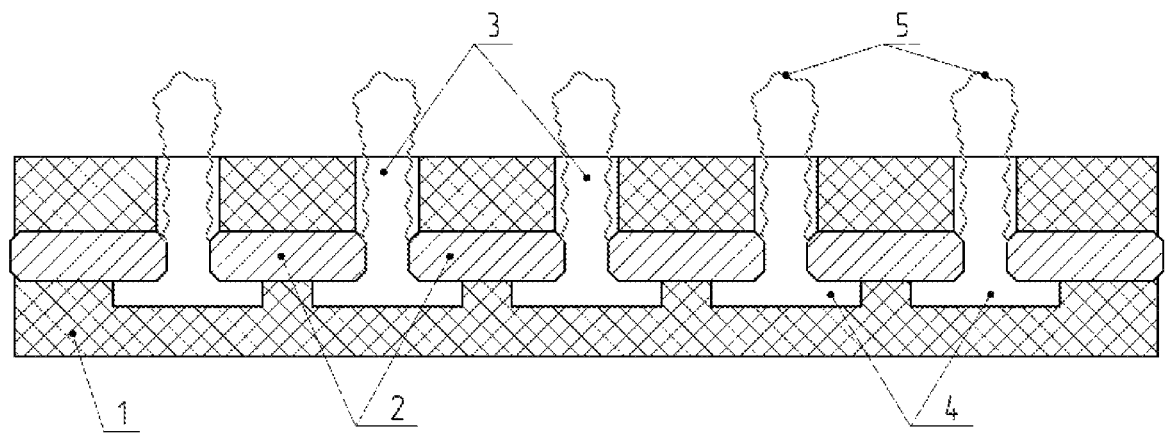
FIG. 1 shows a sectional view of the arrester according to the invention.

Further the present invention is described with reference to the accompanying drawings and particular embodiments. Such a description with particular examples is given for the purpose of explanation of the invention and is not intended to limit the scope of protection of the present invention defined by claims. At the same time, if necessary, the features of the description can be introduced into the claims to more precisely determine the scope of protection.

The drawings show arresters comprising several discharge chambers and more than two electrodes (in particular, five electrodes, but there can be more). At the same time, the present invention covers a case of an arrester with one discharge chamber having two (or more) electrodes located in the insulating body as well. Such a discharge chamber with the discharge gap has an outlet to the surface of the insulating body made with use of dielectric on one side and is connected to a pressurizing chamber (one or more) confined by the insulating body without an outlet to the surface of the insulating body on the other side.

Thus, the pressurizing chamber is connected to the outlet of the discharge chamber by the discharge chamber itself, and there is also the discharge gap on the way from the pressurizing chamber to the outlet. Due to this configuration of the arrester, the high gas pressure generated during the expansion of the spark discharge channel allows compression of the air in the pressurizing chambers on the one hand and creation of a gas stream blowing the discharge arcs out from the chambers to the outside on the other hand. This ensures that the discharge arc is extinguished when a lightning overvoltage pulse has passed and before the moment when the follow current of an industrial frequency has passed through zero.

The implementation of the present invention is possible in various ways, which are further described in relation to an arrester with multiple discharge chambers and, thus, comprising several arresters with one pressurizing chamber. All embodiment described below in relation to the arrester with five electrodes and four discharge chambers between them can also be implemented in the arrester with two electrodes and one discharge chamber between them, unless otherwise is stated and two or more discharge chambers are not required for this implementation.

The following described arresters with a plurality of discharge chambers have advantages over the arrester with a single discharge chamber, namely, due to the plurality of discharge gaps it is possible to reduce the discharge voltage as well as the extinction discharge voltage in each discharge gap as compared to the arrester consisting of the single discharge chamber, which makes possible use of less durable and cheaper materials for manufacturing of the arrester with several discharge chambers.

At the same time, the present invention, which is in providing discharge chambers with pressurizing chambers, provides additional advantages for the arrester with a plurality of discharge chambers due to the fact that, as described below, the discharge is quenched immediately after the pulse current caused by the overvoltage, and, therefore, discharge arcs taken out from several discharge chambers to the outside of the insulating body cannot combine there into a single discharge arc, because the discharge is immediately extinguished.

The combining of discharge arcs into a joint discharge arc is a significant problem in prior art arresters, because even when the discharge arc is broken outside the insulation body, there were all conditions inside the discharge chamber for the discharge arc to resume, which could be taken out again and, therefore, the discharge arc burned for a long time (up to the half-period of the industrial frequency of the voltage in the power line) and often individual discharge arcs from adjacent discharge chambers were combined into one arc. To exclude the combining of the discharge arcs, it was necessary to spread the discharge chambers in space, moving them apart, which led to a decrease in the number of discharge chambers over the length of the arrester (along the line of the chambers).

The present invention eliminates the conditions for the renewal of the discharge arcs in the discharge chambers and, therefore, the discharge arcs from adjacent discharge chambers cannot be combined, because they are quenched earlier than they come in touch with each other even when the discharge chambers are very close (at distances less than the length of the outlet of the discharge chamber to the outside of the insulating body). Due to this, there can be arranged more discharge chambers on the same length of the arrester, which has a positive effect on reducing the discharge quenching voltage and increasing the life of the arrester, because the effect of the discharge on the materials used for arrester manufacturing is reduced. In addition, this simplifies the manufacturing of arrester electrodes, because they can have minimal size and can be made in the form of metal balls.

FIG. 1 shows a sectional view of an example of the arrester with a plurality of discharge chambers for protection of components of electrical equipment or power lines from overvoltages, for example, lightning overvoltages. The arrester includes an insulating body 1 made with use of dielectric and six electrodes 2 mechanically connected to the insulating body. At the same time, it must be considered that in accordance with the present invention the minimum number of electrodes is five and there can be at least four discharge gaps between them.

The electrodes are arranged in a way allowing generation of an electric discharge between adjacent electrodes under the influence of overvoltage (mainly pulsed, for example, lightning). To provide it, the electrodes are arranged with the formation of discharge gaps between them, which have such size and shape that they can be broken by electric discharges when overvoltage is applied to the electrodes (for example, due to lightning strike), however the electric discharges between the electrodes cannot be generated in the absence of overvoltage—this is required to prevent fault to ground of voltage on the current-carrying elements of the electrical power line or other electrical equipment.

In the arrester according to the present invention, the electrodes 2 are located inside the insulating body 1 and separated from its surface by an insulation layer. Adjacent electrodes 2 exit (and sometimes protrude) into the discharge chambers 3 having outlets to the surface of the insulating body. When a lightning overvoltage is applied to one of the electrodes 2, the discharge gaps between adjacent electrodes 2 are broken by spark discharges 5 and a current begins to flow through the arrester due to the charge received by the protected element of the electrical equipment or power line, for example, as a result of a lightning strike.

As the current flows, the spark discharge channel expands and creates a high gas pressure due to the limited volume of the discharge chamber. Since the discharge chambers are open to the surrounding space, gas begins to flow out of the chambers and this gas stream blows spark discharges in the form of discharge arcs from the chambers to the outside. As a result of this, the discharge arcs become longer and their resistance increases.

In order to ensure not only the extension of the spark channels, but also their rupture, the discharge chambers 3 are equipped with pressurizing chambers 4 located near the electrodes 2 and connected to the outlets of the discharge chambers and, therefore, with the discharge chambers 3 through the discharge gaps between adjacent electrodes 2. The pressurizing chambers can be connected to the outlets of the discharge chambers by one channel, as shown in FIGS. 1 to 10. In other embodiments, the pressurizing chambers can be connected to the outlets of the discharge chambers by two or more channels, which allows distribution of gas flows in order to more efficiently remove hot gas from the discharge chamber and increase the resistance of the discharge gap.

The discharge gaps between the electrodes (the space between them) are parts of the discharge chambers, separate the electrodes, and connect the pressurizing chambers with the outlets of the discharge chambers. During the beginning of a spark discharge and the expansion of its channel, the high pressure of a gas (for example, air) generated as a result of an increase in the air (gas) temperature in the spark discharge region propagates into both chambers—pressurizing and discharge chambers, however gas escapes from the discharge chamber and a compression (high pressure) of gas is created in the pressurizing chamber. Thus, due to the fact that the discharge gap separates the chambers, there can be provided different processes in them, while the source for activation of these processes is the same.

As soon as the spark discharge ceases to generate high pressure in these chambers (for example, when the spark discharge channel is blown out from the discharge chamber and the outlet of the discharge chamber), the gas compression in the pressurizing chamber generates an additional gas flow from the pressurizing chamber to the discharge chamber and its outlet through the space between the electrodes (i.e., through the discharge gap or, more precisely, the place of origin of the discharge) and further outward from the arrester. Due to this additional gas flow provided by the increased pressure in the pressurizing chamber generated at the beginning of the spark, discharge the channel of the spark discharge removed from the discharge chamber can be broken and, thereby, the follow current will be stopped even before the industrial frequency current has passed through zero—in the ideal case immediately after the charge caused by a lightning strike has flown.

In addition, the gas flow from the pressurizing chamber ensures the removal of heated gas from the discharge gap. Since the gas in the pressurizing chamber has a low temperature (corresponding to the temperature of the gas before the start of the spark discharge), the gas temperature in the discharge gap decreases when high-temperature gas is displaced by low-temperature gas and, thereby, the resistance of the discharge gap increases. Therefore, when the discharge arc moved out from the discharge chamber to the outside of the arrester has been ruptured, i.e. when it is quenched (which is also facilitated by the additional gas flow exiting the pressurizing chambers), the discharge in the discharge gap of the discharge chamber cannot resume, because the overvoltage is already reduced to lower values due to occurred discharge and these values do not allow resuming of the discharge arc, while the discharge gap resistance is increased to normal (approximately corresponding to the resistance before the spark discharge begins) due to the flow of cold gas from the pressurizing chamber.

The proposed technical solution effectively separates the tasks of providing conditions for an electric discharge and providing the gas flow parameters required for effective extinction of the discharge arc by selecting the appropriate configuration of the pressurizing and/or discharge chambers. Thanks to that, it is possible to independently improve the processes occurring in the arrester.

In the embodiments shown in the figures, pressurizing chambers are located along the electrodes. Due to that, it is possible not to increase or insignificantly increase the dimensions of the arrester. At the same time, other configurations and arrangements of pressurizing chambers are possible, if the condition specified in the claims is fulfilled—the pressurizing chamber and the outlet of the discharge chamber must be separated and connected by the discharge gap, that is, the space between the electrodes. It is this configuration which ensure the pressure increase in the pressurizing chamber due to the spark discharge between the electrodes and the gas flow from the pressurizing chamber, whish displaces the gas located between the electrodes and heated by the spark discharge through the outlet of the discharge chamber to the outside of the insulating body.

In the arrangement shown in the figures, such a configuration can correspond to the outlet from the discharge chamber outward located above the line defined by the electrodes (for example, their middle line or another one) or a horizontal plane passing through such a line, and the pressurizing chamber can be located under the electrodes (for example, under their middle line or other one) or a horizontal plane passing through such a line. However, the disposition of the arrester is not limited to shown in the figures and can differ from shown by rotation, tilting and/or bending to a required direction or in relation to the required axis of rotation, tilting and/or bending.

The arrester with the pressurizing chambers shown in FIG. 1 is complicated to manufacture due to the fact that the removal of removable elements shaping the pressurizing chambers 4 is only possible through cutouts in the insulating body 1, which connect the pressurizing chambers and the outer surface of the insulating body closest to them (in FIG. 1 this is the lower surface). The reason for this is that the pressurizing chamber in FIG. 1 has a large size, which results in that the removable element cannot pass through the outlet from the discharge chamber. However, the cutout in the insulating body must be covered with a dielectric layer when the removable element required for the shaping the pressurizing chamber is removed, which is not technologically advanced, and the cut itself, even covered later by a dielectric, makes the insulating body weaker. In addition, when the discharges are powerful, the pressure created in the pressurizing chambers can knock out the dielectric layer covering the cutout.

Figure 2:
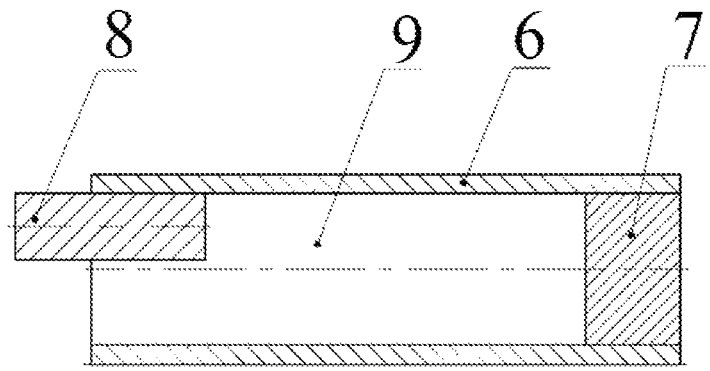
FIG. 2 shows a sectional view of the pressurizing chamber in accordance with the first particular embodiment of the invention.

FIG. 2 shows another embodiment of the arrester, which does not require to remove the removable element forming the pressurizing chamber. The pressurizing chambers 9 can be confined by metal elements 6 at least partially covering the electrodes 8. These metal elements can be made of sheet metal or bulk metal pieces by cutting, drilling, milling and other operations known in the prior art. In addition, metal elements can be made by casting or extrusion. The metal elements 6 can be made of copper, aluminum, steel and other metals or their alloys, and the electrodes 8 can be made of tungsten, steel or other metals or their alloys.

The presence of such metal limiters (shapers) 6 of the pressurizing chambers 9 provide relaxation in the requirements to the strength characteristics of the insulating body at the location of the pressurizing chambers, so that the insulating body can be made not only of solid, rigid and/or durable dielectrics, but also of to some extent soft ones, for example, with use of silicone rubber including quite flexible and soft one.

The need for such a reinforcement can be prescribed by the fact that, in contrast to the discharge chambers 3, where gases exit outward under the action of high pressure and the pressure decreases (i.e., is limited in magnitude), the gas pressure in the pressurizing chambers can increase to very high values, because gas can escape from the pressurizing chamber only through the discharge gap into the discharge chamber and during the start and escalation of the discharge, gas from the discharge gap only enters the pressurizing chamber, preventing its exit. In this regard, the presence of metal elements 6 prevents the deformation of the insulating body and mechanically strengthens the design of the arrester.

In addition, the use of such metal elements simplifies the manufacturing of the arrester, because there is no need to remove the embedded elements from the insulating body, which are designed to shape the cavities of the pressurizing chambers when the insulating body is manufactured with use of polymers by filling the appropriate molds. These metal elements simultaneously confine the pressurizing chamber and are embedded elements that do not need to be removed.

The metal elements 6 can at least partially encompass two electrodes protruding into adjacent discharge chambers, that is, serve as both electrical and mechanical connection for such electrodes. In a case that the same electrode enters adjacent discharge chambers, the metal element can be mounted on it or located next to it in order to ensure the manufacturability of the arrester.

In a particular embodiment of the invention, the metal elements can be tubes covering the electrodes and confining the pressurizing chambers next to the electrodes in the transverse direction of the tube (in other words, in the plane which is diametric or transverse to longitudinal axis of the tube). This technical solution allows us to solve the problem of forming pressurizing chambers confined by metal elements in a fairly simple way. Pressurizing chambers can be confined in the longitudinal direction with plugs 7 as shown in FIG. 2 or by clamping of the tubes in the transverse direction, for example, in the middle part 11 of the tubes 10 in FIG. 4 or in a part (longitudinal and/or transverse) of the tube that does not envelop the electrode. Alternatively, this result can also be achieved by connecting the tubes with a blocking element, for example, by welding, soldering, gluing or other methods.

To achieve that, each of the discharge chamber electrodes shaped as rods is fixed with its own metal tube having an inner diameter larger than the diameter (or transverse size) of the electrode by crimping the tube with the electrode inserted into it. At the same time, a pressurizing chamber is configured near the electrode, mainly along it, thanks to that the inner diameter of the tube exceeds the diameter of the electrode.

Figure 3:
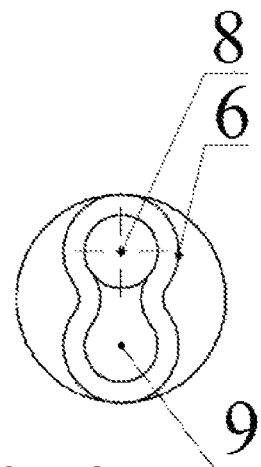
FIG. 3 shows a side view of the pressurizing chamber in accordance with the first particular embodiment of the invention.
Figure 4:
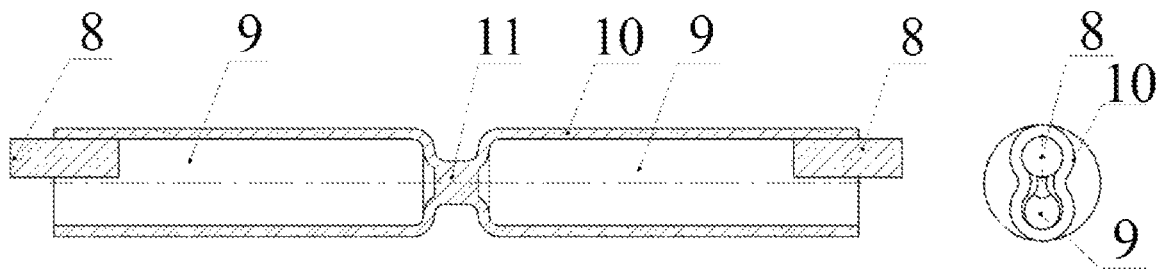
FIG. 4 shows a sectional view of the pressurizing chamber in accordance with the second particular embodiment of the invention.
Figure 5:
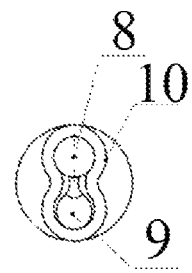
FIG. 5 shows a side view of the pressurizing chamber in accordance with the second particular embodiment of the invention.

Depending on the excess of the inner diameter of the tube over the diameter of the electrode, the cross section of the configured pressurizing chamber can have a different shape. In a particular embodiment, the cross section of the tube at the mounting point of the electrode can have a shape similar to number eight (i.e. 8), that is, the diameter of the compression part of the tube and the pressurizing chamber can be similar in size or the same. An example of such compression of the electrode 8 with the formation of a cross section of a tube 6 or 10 with a shape similar to number eight is shown in FIGS. 3 and 5, respectively.

The pressurizing chamber obtained in this way can be blocked at the required distance from the end of the tube or have exit to any volume, open space or adjacent discharge chamber (in the latter case, the electrodes of adjacent discharge chambers can be fixed with the same tube). In addition, if the electrode is shorter along the length of the tube than the pressurizing chamber, the latter can have a wider cross section in the place where the electrode is absent (this is for the case when sufficiently short electrodes are used and there can be some distance between them in the arrester).

Figure 6:
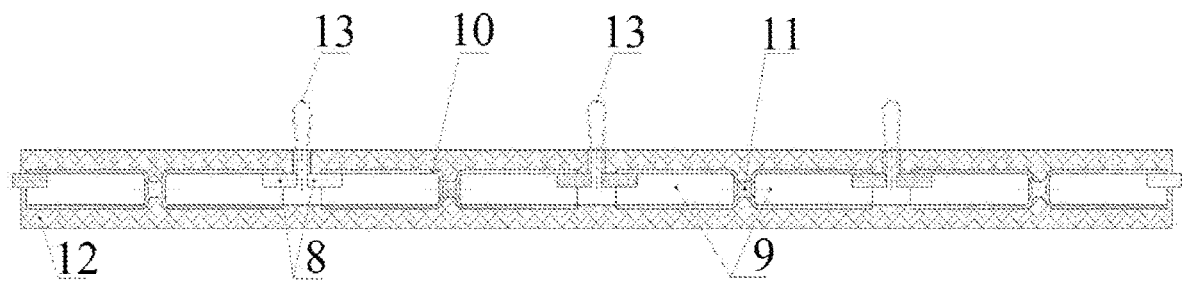
FIG. 6 shows a cross-sectional view of the arrester in accordance with the second particular embodiment of the invention.

FIGS. 1 and 6 show the separate pressurizing chambers 4 and 9, respectively, that is, each discharge chamber is connected to its own separate pressurizing chamber. In FIG. 1, the pressurizing chambers 4 are separated from each other by dielectric sections (more precisely, when pressurizing chambers 4 were manufactured, sections of the insulating body 1 between them were left invariant).

In FIG. 6, the pressurizing chambers 9 are embodied by means of tubes 10 located in the insulating body 12 and separated from each other (which means that the pressurizing chambers have outlets to adjacent discharge chambers) by making metal elements impermeable for gas in the middle part 11. For example, when the metal elements are made of sheet metal, this can be done by clamping (blocking, plugging) in the parts 11 confining the pressurizing chambers 9 in the longitudinal direction. When the arrester shown in FIG. 6 is triggered, discharges 13 pass between adjacent electrodes 8, moved out of the discharge chambers due to gas pressure and quenched (ruptured) due to gas pressure from pressurizing chambers 9.

Figures 7, 8:
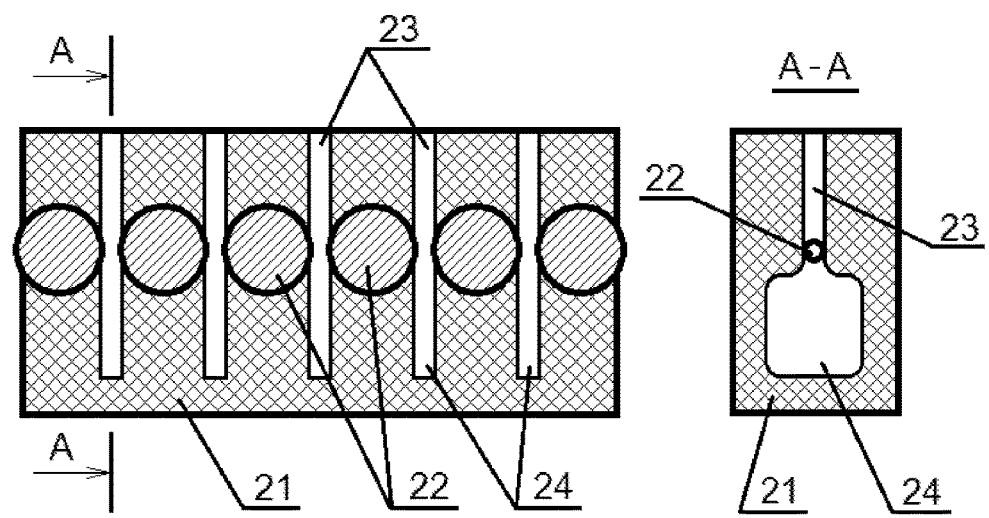
FIG. 7 shows a cross-sectional view of the arrester in accordance with the third particular embodiment of the invention.
FIG. 8 shows a cross-sectional view of the arrester in accordance with the third particular embodiment of the invention in the plane A-A shown in FIG. 7.

FIGS. 7 and 8 show another embodiment of the arrester according to the present invention. The insulating body 21 of the arrester is preferably made with use of elastic dielectric, for example, silicone rubber or other polymers. The use of the elastic dielectric allows not only bending of the insulating body and the arrester, but also provides the possibility of manufacturing of the arrester with pressurizing chambers in accordance with this embodiment of the arrester.

The electrodes 22 of a spherical shape are placed in the insulating body. They can have another shape, for example elongated or flattened one, however the spherical electrodes have an advantage in use, because they are cheap to manufacture and balls from bearings, shot or other similar metal products can be used as these electrodes.

The electrodes 22 exit into the discharge chambers having the outlets 23 from discharge chambers to the surface of the insulating body. These outlets can have the constant or variable section along their length. For example, they can expand or narrow. Their cross section can be round, oval, square, rectangular or any other suitable shape.

The pressurizing chambers 24 are located in a part of the insulating body 21 opposite to the location of the outlets 23 from the discharge chambers. The dimensions of the pressurizing chambers 24 in the directions along adjacent electrodes 22 located near the pressurizing chambers 24 (that is in the horizontal direction in FIG. 7) are approximately the same as the size of the outlets 23 and the distance between the electrodes 21 in the same direction. This is provided in order to provide opportunity to pull a removable insert shaping the pressurizing chamber and called the "mandrel" out of the insulating body.

In a preferred embodiment, the size of the pressurizing chamber in the direction along the adjacent electrodes located near the pressurizing chamber is less than the distance between adjacent electrodes in the discharge chamber connected to this pressurizing chamber. This is preferable in order to provide opportunity to pull the mandrel used to shape the pressurizing chamber out without obstacles after the molding of the insulating body is finished. However, even if the distance between the electrodes is less than the transverse size of the mandrel in the part that shapes the pressurizing chambers (as shown in FIG. 7), the mandrel can be pulled out of the insulating body due to the fact that the insulating body is made of elastic material and the electrodes can move apart when removing the mandrel and, after removal, can snap into a prescribed location due to the elastic properties of the material used for molding the insulating body.

The volume of the pressurizing chamber should be preferably at least a half of the volume of the discharge chamber and the outlet connected to it. This is necessary to provide that a sufficient amount of gas is compressed in the pressurizing chamber to blow hot gas out from the space between the electrodes after the discharge arc leaves the insulating body.

Preferably, the volume of the pressurizing chamber is advantageously greater than the volume of the discharge chamber and the outlet connected to it. This can be achieved by making the pressurizing chamber longer, however this will increase the thickness of the insulating body and is only possible to a certain extent. Another way to increase the volume of the pressurizing chamber is to increase its size in the transverse direction, that is, in a plane perpendicular to the direction along adjacent electrodes located near the pressurizing chamber.

FIG. 8 shows a cross section of the arrester in FIG. 7 in the plane A-A. FIG. 8 shows that the pressurizing chamber 24 has transverse dimensions in this plane several times larger than the width of the exit 23 in the same plane, as well as its size in the plane perpendicular to the shown one. Due to this, it is possible to provide an increased volume of the pressurizing chamber larger than the volume of the discharge chamber and the outlet without increasing the thickness of the insulating body (the size of the insulating body 21 in the vertical direction in FIGS. 7 and 8).

Since the size of the pressurizing chamber in the direction along the adjacent electrodes is preferably not larger than the distance between the electrodes, the dimensions of the pressurizing chambers in the directions perpendicular to the indicated directions along the adjacent electrodes are larger than the distances between the adjacent electrodes in the discharge chambers. Thus, the dimensions of the pressurizing chambers in the directions along the adjacent electrodes located near the pressurizing chambers are smaller than the dimensions of the pressurizing chambers in the directions perpendicular to the indicated directions along the adjacent electrodes. This is the main difference of FIGS. 7 and 8 from FIGS. 1 to 6, which provides the possibility of manufacturing a reliable arrester with pressurizing chambers in a convenient and technological way.

It should be noted that the volume of the pressurizing chamber should be preferably no more than ten volumes of the discharge chambers and the outlets connected to them, because only under this condition it is possible to create a pressure providing a gas flow sufficient for the present invention.

Figure 9:
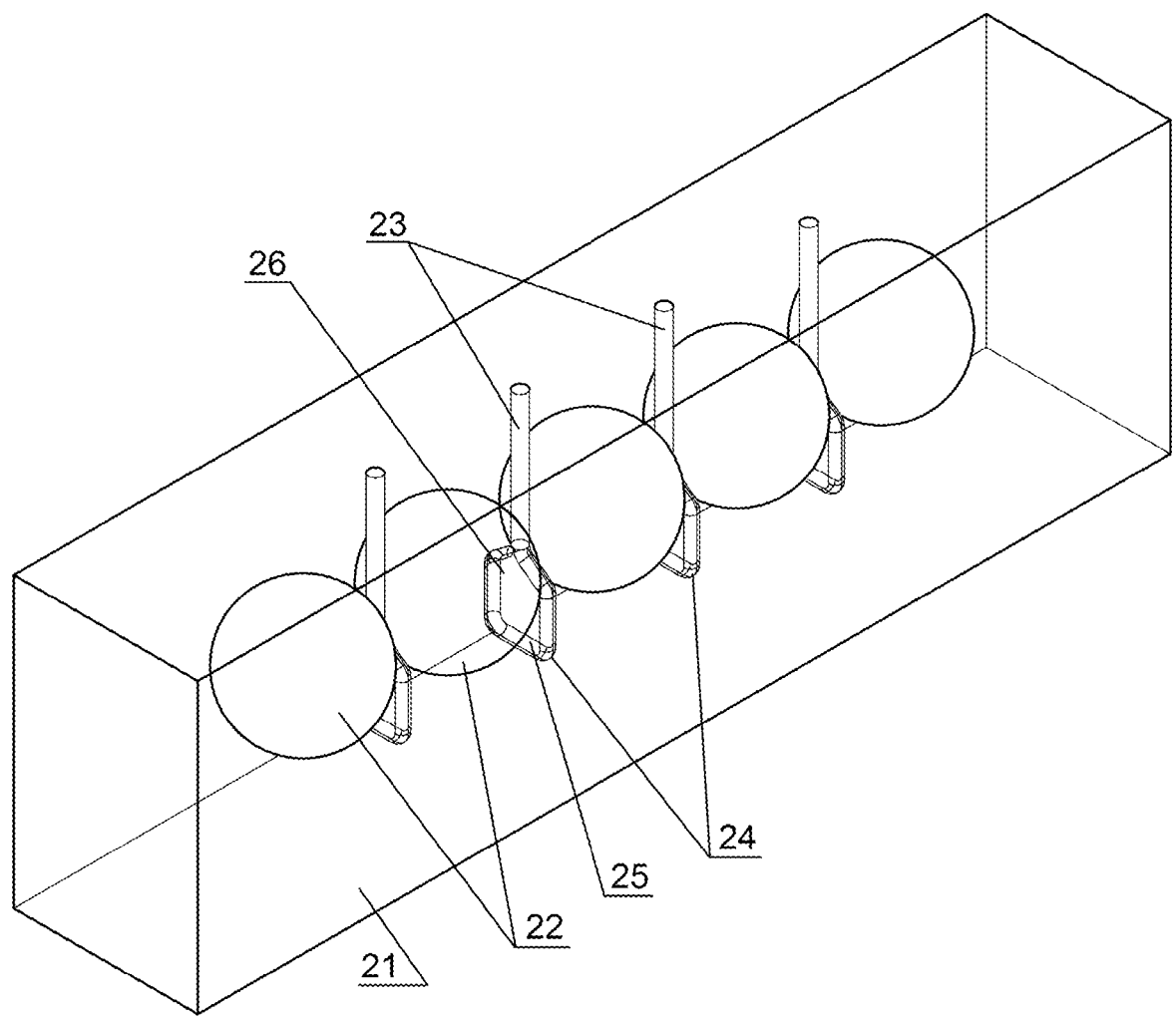
FIG. 9 shows a semi-transparent solidview of the arrester in accordance with the third particular embodiment of the invention in volume.

FIG. 9 shows a three-dimensional image of the insulating body 21 with the electrodes 22, the outlets 23 and the pressurizing chambers 24 located inside it. The electrodes 22 shaped as balls are located in the insulating body 21 along the longitudinal dimension of the insulating body, and there are discharge chambers between the electrodes 22, wherein the discharge chambers transit to the outlets 23 on the one side and are connected to the pressurizing chambers 24 on the other side. One of the electrodes (the second one from the left) is shown as "transparent" in order to more clearly represent the location of the pressurizing chambers, i.e. a part 26 of the pressurizing chamber 24 is visible through it, while a part of the adjacent pressurizing chambers 24 similar to the part 26 is not visible behind the "opaque" electrodes 22, but only a part 25 is visible. Thanks to the part 26 of the pressurizing chamber shown explicitly behind a "transparent" electrode, it is possible to more clearly visualize the relative positions of the electrodes, the pressurizing chambers and the outlets in the insulator body of the arrester.

It is seen that due to the transverse orientation of the pressurizing chamber relative to the longitudinal direction of the arrester (i.e., when the dimensions of the pressurizing chambers in the directions along the adjacent electrodes located near the pressurizing chambers are smaller than the dimensions of the pressurizing chambers in the directions perpendicular to the indicated directions along the adjacent electrodes) there can be included more electrodes and discharge chambers into the insulating body along the insulating body (a line passing through the electrodes). It is advantageous for the properties of the arrester, because the discharge voltage and the voltage of the quenching of the discharge are reduced in each individual discharge chamber, while the discharge voltage of the entire arrester can be obtained sufficiently large due to the series connection of the discharge chambers. Thus, in accordance with the present invention there can be an arrester with a shorter length providing a given discharge voltage.

The arrester shown in FIGS. 7 to 9 can be manufactured in the following way. To implement this method, there is required a mold (matrix) configured to mold the insulating body of the arrester of the required shape. In addition, to implement the method, there are also required mandrels shaping the pressurizing chambers, the discharge chambers and the outlets of the discharge chambers to the surface of the insulating body—that is, one mandrel will shape the pressurizing chamber, the discharge chamber and the outlet from the discharge chamber all at once.

Figure 10:
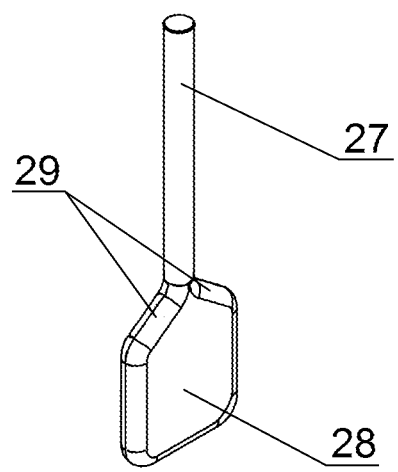
FIG. 10 shows the mandrel used for the manufacturing of the arrester shown in FIGS. 7 to 9.

FIG. 10 shows an example of such a mandrel. The mandrel consists of a rod 27 attachable to the mold by one end (in FIG. 10—the upper one) and a flat part 28 attached to another end of the rod. The flat part 28 is required to shape the pressurizing chamber, and the rod 27 is required to shape the discharge chamber (approximately near (slightly higher in FIG. 10) the junction of the parts 27 and 28) and the discharge chamber outlet outward the insulating body. The flat portion 28 mainly contains inclined shoulders 29 ensuring the removal of the mandrel from the manufactured insulating body without tearing pieces of dielectric due to the fact that these shoulders will compress the insulating body gradually as it is removed from the insulating body.

The method comprises the following steps:

1) Electrodes and mandrels are placed in the mold. The mandrels are placed between the electrodes. This can be done as follows: mandrels are installed in the mold, and then electrodes are placed between them.

2) The mold is filled with dielectric material and it is cured. The solidified dielectric material must be resilient—this is required in order to that when the mandrels have been removed, the insulating body takes the shape that it had before the mandrels were removed later on.

3) The insulating body is removed from the mold.

4) The mandrels are removed from the insulating body.

Operations 3) and 4) can occur simultaneously or in reverse order. Curing a dielectric material is meant such a change in the physical properties of the material which allows the insulating body to maintain its shape given by the mold and the mandrels after removing it from the mold and removing mandrels from it. Thus, curing does not mean that the insulating body becomes hard or brittle. This means that it becomes non-liquid and cannot arbitrarily change its shape any longer. For example, in the case where the dielectric material used for the manufacturing the insulating body is polymeric, the curing can be understood as polymerization of the polymer, i.e. its crosslinking by long chains of polymers. There can be used such processes as vulcanization, heating, chemical curing, etc., to cure the insulating body.

Figure 11:
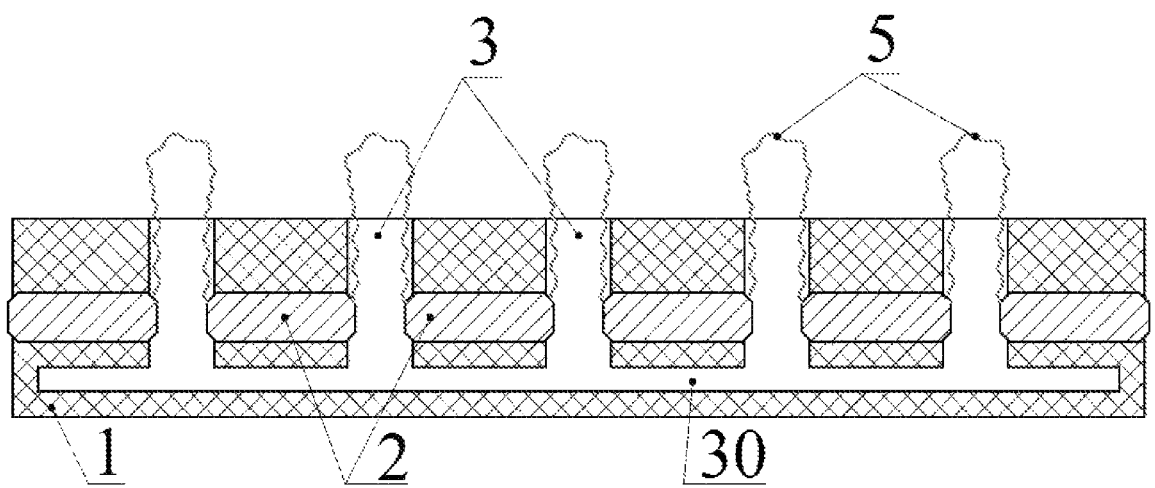
FIG. 11 shows a sectional view of the arrester in accordance with the fourth particular embodiment of the invention.

FIG. 11 shows an embodiment of the arrester having pressurizing chambers of several discharge chambers combined into one common pressurizing chamber 30. Structurally, the arresters in FIGS. 1 and 11 coincide with the exception of pressurizing chambers; therefore, the description of the arrester in FIG. 1 also applies to the arrester in FIG. 11 (except the pressurizing chamber 30). The difference between these embodiments is that during successive discharges between the electrodes 2 excess pressure is created in one pressurizing chamber 30, and since this pressurizing chamber is connected to the outlets 3 through the discharge gaps between the electrodes and when the discharge arcs 5 has been carried away from the discharge chambers after, the pressure in the pressurizing chamber 30 creates gas flows, which carry high-temperature gas away from the discharge chambers and extinguish the arcs 5.

The advantage of the arrester configuration in FIG. 11 is that one removable element is sufficient to shape the pressurizing chamber for a plurality of discharge chambers, wherein when the manufacturing of the insulating body (i.e. curing of the dielectric material) is finished, this removable element can be removed from the insulating body through its end surface, which can be further tightly and firmly closed (sealed). It also simplifies the manufacturing process of the arrester.

The described configurations of the arrester and/or arresters manufactured in accordance with the above-described method can be used both individually and as part of other devices and elements of electrical equipment or power lines. The end electrodes (first and last ones) of the arrester can protrude or exit outside the insulating body so that they receive overvoltage. Overvoltage can come through direct (immediate) contact or through the spark gap. In addition, the end electrodes can have a shape differing from the shape of the electrodes between them (intermediate electrodes). They can be, for example, in the form of rods (straight or curved) or other three-dimensional volumetric parts including complex shapes. An indispensable condition for them is that they must constitute discharge gaps with the intermediate electrodes.

The arrester in accordance with the present invention can be used, for example, as part of an insulator-arrester, wherein the arrester is placed, for example, on an insulating body of the insulator. The insulator-arrester contains the insulating body and fixtures in the form of the first and second fixture elements installed at its ends, the first fixture element is configured to be connected directly or by means of a fixing device to a high-voltage wire or to the second fixture element of a previous high-voltage insulator of the said column or string, and the second fixture element is configured to be connected to a tower or to the first fixture element of the subsequent high-voltage insulator of the column or string.

Such an insulator-arrester contains the arrester according to any of the above-described embodiments installed with the possibility of forming an electric discharge between the first element of the fixtures and at least one electrode adjacent to it, as well as the second element of the fixtures and at least one adjacent electrode under the influence of lightning overvoltage. It is assumed that the arrester is installed with the possibility of developing discharges in the discharge chambers between adjacent electrodes in the arrester itself during the interval between the formation of an electric discharge between the first fixture element and at least one electrode adjacent to it, as well as the second fixture element and at least at least one electrode adjacent to it.

The arrester can also be installed around (i.e. with the envelope) various elements of electrical equipment or power lines, thereby forming a screen for protection against corona discharge (corona ring, corona shield)—for this, the enveloping arrester can be equipped with fasteners for fastening on the element of the electrical equipment or power lines to be enveloped. The obtained in this way corona ring-arrester contains an insulating body configured to be mechanically fastened to the element of electrical equipment or power lines with at least partial enveloping of the said or adjacent element of electrical equipment or power lines. The corona ring-arrester also comprises the arrester according to any of the above-described embodiments mounted at a distance from the element of the electrical equipment or power line to be enveloped. Advantageously, the arrester is separated from the enveloped element of the electrical equipment or the power line by an air gap along the arrester, wherein the fastening elements of the insulating body can pass through this air gap.

Electrical power lines can use the arrester in accordance with the present invention both by itself and as a part of the above-mentioned protective elements—the insulator-arrester and/or the corona ring protecting against corona discharge. The electrical power lines usually contain towers, single insulators and/or insulators assembled in columns or strings, and at least one wire under high electrical voltage connected directly or by means of fastening devices to fixture elements of the single insulators and/or the first insulators of the column or strings of the insulators, wherein each single insulator or each column or string of insulators is mounted to one of the towers by means of an element of its fixture adjacent to the said tower. In accordance with the invention, the electrical power line comprises at least one arrester according to any of the above-described embodiments and/or at least one corona ring-arrester according to the above-described embodiment and/or at least one of the insulators is the insulator-arrester according to the above-described embodiment.

The use of the arrester in accordance with the present invention alone or as a part of the insulator-arresters or corona rings to protect a high-voltage power line or other types of electrical equipment from lightning overvoltages can improve the reliability of the electrical power line, increase the service life of electrical equipment and reduce the cost of their operation.

The invention claimed is:

1. An arrester for protection of electrical elements of electrical equipment or power lines from overvoltage, the arrester includes an insulating body made with use of dielectric and two or more electrodes mechanically connected to the insulating body and arranged with the formation of a discharge gap between them, wherein the discharge gap is the space between the electrodes, the electrodes are located inside the insulating body and separated from its surface by an insulation layer, wherein the electrodes exit into at least one discharge chamber having an outlet to the surface of the insulating body, wherein the discharge chamber is provided with one or more pressurizing chambers connected to the outlet of the discharge chamber through the discharge gap between the electrodes, wherein the discharge gap is on the way from the pressurizing chamber to the outlet.

2. The arrester according to claim 1, wherein the arrester includes five or more electrodes mechanically connected to the insulating body and arranged with the formation of discharge gaps between adjacent electrodes, wherein the electrodes are located inside the insulating body and separated from it surface by an insulation layer, wherein the adjacent electrodes exit into the discharge chambers having outlets to the surface of the insulating body.

3. The arrester according to claim 2, wherein two or more discharge chambers are provided with one or more pressurizing chambers connected to the outlets of the discharge chambers through the discharge gaps between the electrodes.

4. The arrester according to claim 3, wherein the pressurizing chambers of several discharge chambers are combined.

5. The arrester according to claim 3, wherein one or more pressurizing chambers are confined by metal elements at least partially enveloping the electrodes.

6. The arrester according to claim 3, wherein one or more pressurizing chambers are connected to the outlets from the corresponding discharge chambers by two or more channels.

7. The arrester according to claim 1, wherein one or more pressurizing chambers are confined by metal elements at least partially enveloping the electrodes.

8. The arrester according to claim 7, wherein the metal elements at least partially envelop two electrodes exiting into adjacent discharge chambers.

9. The arrester according to claim 7, wherein the metal elements are tubes enclosing the electrodes and confining the pressurizing chambers.

10. The arrester according to claim 9, wherein the pressurizing chambers are confined in the longitudinal direction by blocking the tubes in the part located between the electrodes.

11. The arrester according to claim 1, wherein one or more pressurizing chambers are connected to the outlets from the corresponding discharge chambers by two or more channels.

12. The arrester according to claim 1, wherein the size of one or more pressurizing chambers in the direction along adjacent electrodes located near the pressurizing chambers is smaller than the size of the same pressurizing chamber in a direction perpendicular to the said direction along adjacent electrodes.

13. The arrester according to claim 1, wherein the size of one or more pressurizing chambers in the direction along adjacent electrodes located near the pressurizing chambers is less than the distance between adjacent electrodes in the discharge chamber.

14. The arrester according to claim 1, wherein the size of one or more pressurizing chambers in a direction perpendicular to the direction along adjacent electrodes is larger than the distance between adjacent electrodes in the discharge chamber.

15. The arrester according to claim 1, wherein the volume of the pressurizing chamber is not less than half the total volume of the discharge chamber and the outlet connected to it.

16. The arrester according to claim 1, wherein the volume of the pressurizing chamber is not more than ten total volumes of the discharge chamber and the outlet connected to it.

17. A method of manufacturing of the arrester according to claim 1 with use of a mold configured to shape the insulating body of the arrester and one or more mandrels configured to shape one or more pressurizing chambers, one or more discharge chambers; and the exits of the discharge chambers to the surface of the insulating body in the insulating body to be shaped, the method includes the following steps:
placing electrodes and mandrels in the mold, wherein the mandrels being placed between the electrodes;
filling the mold with a dielectric material and curing it, wherein the dielectric material is elastic when it has been cured;
removing the insulating body from the mold;
extraction the mandrels from the insulating body.

18. An insulator-arrester for mounting a high-voltage wire in an electrical equipment or on an electrical power line as a single insulator or as part of a column or string of insulators, the insulator-arrester includes an insulating element and fixtures in the form of the first and second fixture elements installed at its ends, wherein the first fixture element is configured to be connected with a high-voltage wire directly or with use of a fastening device or with the second fixture element of a previous high-voltage insulator of the said column or string, and the second fixture element is configured to be connected to a tower or to the first fixture element of a subsequent high-voltage insulator of the said column or string, wherein the insulator-arrester includes the arrester according to claim 1, wherein the arrester is mounted with the formation of a discharge gap between the first fixture element and at least one electrode adjacent to it, as well as between the second fixture element and at least one electrode adjacent to it under the influence of lightning overvoltage.

19. A corona ring-arrester including an insulating and/or metal base configured to be mechanically fastened to an element of electrical equipment or power lines with at least partial enveloping of the said or adjacent element of the electrical equipment or power lines, wherein the corona ring-arrester includes the arrester according to claim 1, wherein the arrester is mounted at a distance from the enveloped element of the electrical equipment or power line.

20. An electrical power line including towers, single insulators and/or insulators assembled in columns or strings, and at least one wire under high electric voltage connected directly or with use of fastening devices with fixture elements of single insulators and/or first insulators of columns or strings of insulators, wherein each single insulator or each column or string of insulators is fastened to one of the towers with use of its fixture element adjacent to the said tower, wherein the electrical power line includes at least one arrester according to claim 1.

* * * * *